US012792788B2

(12) United States Patent
Sethi et al.

(10) Patent No.: US 12,792,788 B2
(45) Date of Patent: Nov. 10, 2026

(54) HARDWARE TAMPERING DETECTION

(71) Applicant: Dell Products L.P., Round Rock, TX (US)

(72) Inventors: Parminder Singh Sethi, Punjab (IN); Srinath Kappgal, Cork (IE); Malathi Ramakrishnan, Madurai (IN); Daniel L. Hamlin, Round Rock, TX (US); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 18/537,431

(22) Filed: Dec. 12, 2023

(65) Prior Publication Data

US 2025/0190635 A1 Jun. 12, 2025

(51) Int. Cl.

| | |
|---|---|
| ***G06F 21/86*** | (2013.01) |
| ***G08B 25/00*** | (2006.01) |
| *G06F 21/00* | (2013.01) |
| *G06F 21/55* | (2013.01) |
| *G08B 13/06* | (2006.01) |
| *G08B 13/08* | (2006.01) |
| *G08B 13/12* | (2006.01) |
| *G08B 29/04* | (2006.01) |
| *G08B 29/08* | (2006.01) |

(52) U.S. Cl.

CPC ............. *G06F 21/86* (2013.01); *G08B 25/00* (2013.01); *G06F 21/00* (2013.01); *G06F 21/55* (2013.01); *G08B 13/06* (2013.01); *G08B 13/08* (2013.01); *G08B 13/128* (2013.01); *G08B 29/046* (2013.01); *G08B 29/08* (2013.01)

(58) Field of Classification Search

CPC .......... G06F 21/00; G06F 21/86; G06F 21/55; G08B 25/00; G08B 13/06; G08B 13/08; G08B 13/128; G08B 29/046; G08B 29/08

See application file for complete search history.

(56) References Cited

U.S. PATENT DOCUMENTS

| | | | | |
|---|---|---|---|---|
| 9,214,082 | B2 * | 12/2015 | Koenig | G08B 25/08 |
| 12,248,619 | B2 * | 3/2025 | Bower, III | G06F 21/86 |
| 2015/0373487 | A1 * | 12/2015 | Miller | G06Q 10/0833 455/456.1 |
| 2017/0032658 | A1 * | 2/2017 | Magyar | G08B 25/008 |
| 2018/0253569 | A1 * | 9/2018 | Swierk | G06F 21/554 |
| 2022/0398597 | A1 * | 12/2022 | Sinha | G06F 21/602 |
| 2024/0095329 | A1 * | 3/2024 | Fang | G06F 21/31 |

OTHER PUBLICATIONS

"Understanding Tamper Detection Sensors"—Texas Instruments, Nov. 2019 https://www.ti.com/lit/ta/sszt372/sszt372.pdf?ts=1783582330843 (Year: 2019).*

"Intelligent Anti-Tamper Design for Embedded Systems Using Machine Learning"—Halak et al, Springer, Apr. 23, 2022 https://link.springer.com/chapter/10.1007/978-3-030-94178-9_1 (Year: 2022).*

* cited by examiner

*Primary Examiner* — Randy A Scott

(74) *Attorney, Agent, or Firm* — Jackson Walker L.L.P.

(57) ABSTRACT

An information handling system may include at least one processor, a plurality of physical sensors, and a firmware having instructions coded thereon that are executable by the at least one processor for: detecting, based on one or more of the physical sensors, a tampering event associated with the information handling system; and transmitting data regarding the tampering event to a central monitoring system.

15 Claims, 4 Drawing Sheets

HARDWARE TAMPERING DETECTION

TECHNICAL FIELD

The present disclosure relates in general to information handling systems, and more particularly to detecting tampering in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSANT™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

Physical security is important in edge deployments of HCI systems as well as in other types of information handling systems. Existing security measures often focus on software-based protections, leaving the hardware of an information handling system vulnerable to unauthorized access or manipulation. Edge devices, such as internet-of-things (IoT) devices and embedded systems, are very susceptible to physical tampering, which can compromise the confidentiality, availability, and reliability of the system.

There is thus a need for a system that detects and alerts against hardware tampering attempts on edge devices and other devices. The system may utilize physical sensors and tamper-evident mechanisms to provide early detection of hardware tampering attempts. Embodiments may ensure the integrity and security of the hardware components and enhance the overall security of edge devices.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with detection of tampering in information handling systems may be reduced or eliminated.

In accordance with embodiments of the present disclosure, an information handling system may include at least one processor, a plurality of physical sensors, and a firmware having instructions coded thereon that are executable by the at least one processor for: detecting, based on one or more of the physical sensors, a tampering event associated with the information handling system; and transmitting data regarding the tampering event to a central monitoring system.

In accordance with these and other embodiments of the present disclosure, a method may include an information handling system detecting, via a plurality of physical sensors thereof, a tampering event associated with the information handling system; and the information handling system transmitting, via a firmware thereof, data regarding the tampering event to a central monitoring system.

In accordance with these and other embodiments of the present disclosure, an article of manufacture may include a non-transitory, computer-readable medium having computer-executable instructions thereon that are executable by a processor of an information handling system for: detecting, via a plurality of physical sensors of the information handling system, a tampering event associated with the information handling system; and transmitting, via a firmware thereof, data regarding the tampering event to a central monitoring system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
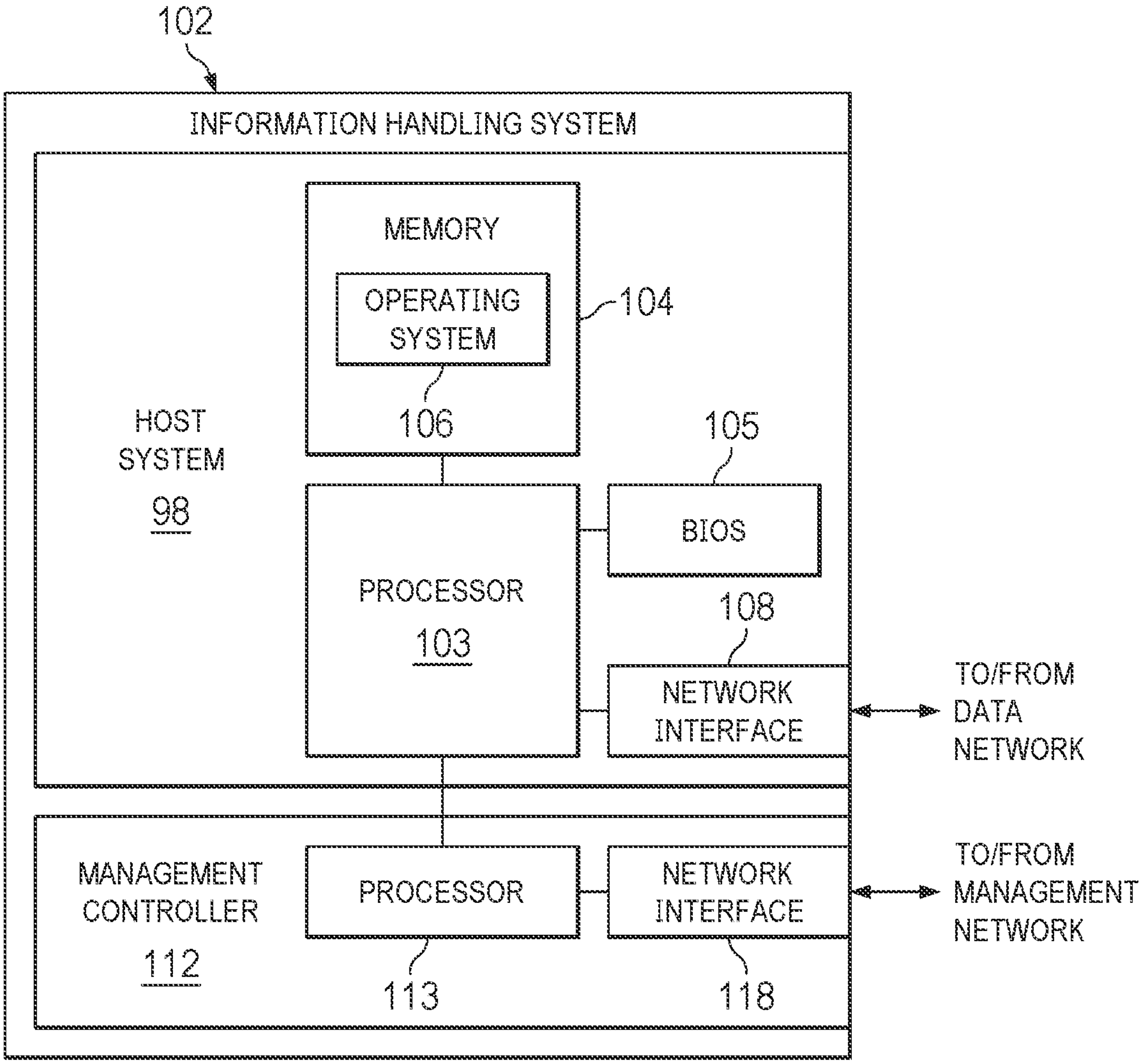
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in the physical security of information handling system 102 by providing detection and alerts based on tampering. It should be noted that while the scenario of an edge deployment is discussed in detail herein for the sake of concreteness, other embodiments are also specifically contemplated within the scope of this disclosure.

Figure 2:
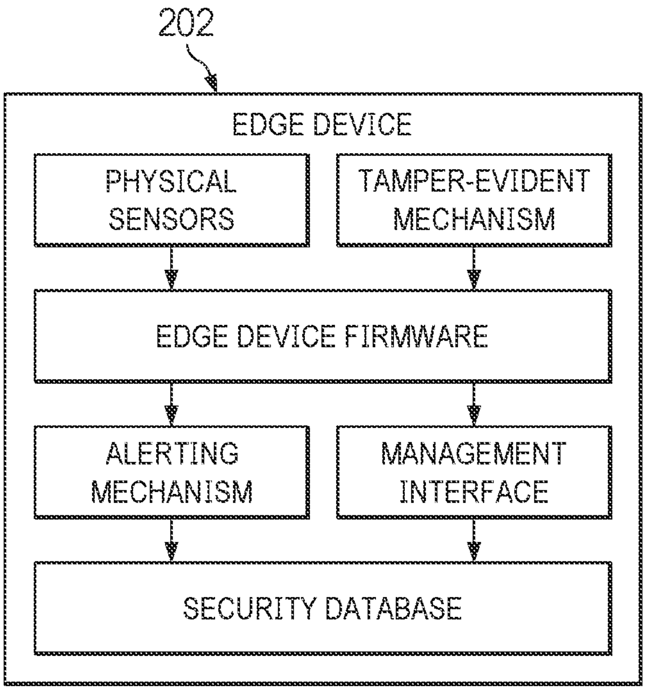
FIGS. 2-3 illustrate example architectures, in accordance with embodiments of the present disclosure.

FIG. 2 illustrates an example system for detecting and alerting against hardware tampering attempts on edge device 202. Physical sensors and tamper-evident mechanisms may be used to detect and notify an administrator about potential hardware tampering or unauthorized access, ensuring the integrity and security of the hardware components.

The tamper detection system may provide early detection of hardware tampering attempts on edge devices, and it may in some embodiments be implemented (in whole or in part) via firmware on edge devices to monitor physical sensors and detect tampering. The alerting mechanism may also store security events in a security database, which may be accessible via a management interface.

The device firmware may also establish communication between edge devices 202 and a central monitoring system configured to receive tampering alerts and analyze the data.

Embodiments may provide integration of physical sensors to monitor and detect physical indicators of tampering attempts. By leveraging physical sensors such as vibration sensors, accelerometers, temperature sensors, switches that actuate when a chassis panel is removed, tilt sensors, etc., the system can provide early detection of tampering events, enhancing the security of the hardware components.

Tamper-evident mechanisms such as seals, tamper-resistant screws, or special coatings on the edge devices may also be incorporated. These mechanisms help detect any physical changes or unauthorized access to the hardware components, providing an additional layer of security.

The firmware running on the edge devices may be implemented to monitor the physical sensors and detect tampering attempts. This may act as the first line of defense, continuously analyzing sensor data and triggering alerts when tampering events are detected.

The central monitoring system may receive tampering alerts from multiple edge devices. This central monitoring system then analyzes the data, determines the severity of tampering attempts, and provides a unified interface for managing and responding to these alerts.

A customizable alerting mechanism may promptly notify administrators about detected tampering attempts. The alerting mechanism can be tailored to different severity levels of tampering events, ensuring appropriate actions can be taken in response. For example, an accelerometer event may be classified as relatively low-severity, while a chassis opening event may be classified as higher-severity, etc.

Embodiments thus provide an integrated and proactive approach to detect and alert an administrator against hardware tampering attempts on edge devices. Embodiments provide early detection, enhanced security, and the ability to respond effectively to tampering events, safeguarding the integrity and security of the hardware components in edge computing environments. For example, in addition to sending alerts, some embodiments may also be operable to take additional remedial actions such as shutting down the edge system, encrypting data, etc.

Figure 3:
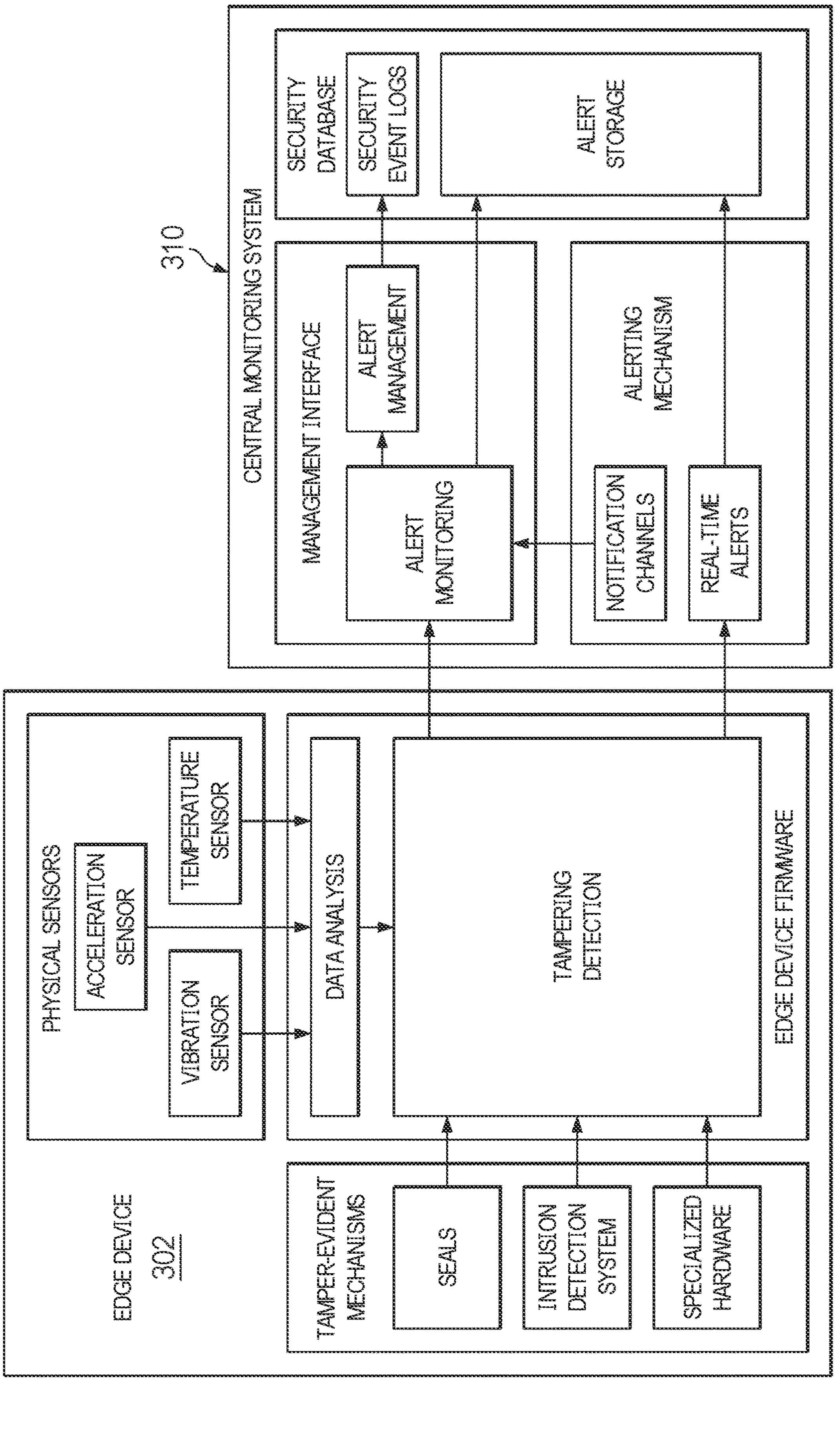

FIG. 3 provides a high-level architecture diagram. As shown, edge device 302 includes physical sensors and tamper-evident mechanisms which are communicatively coupled to its firmware. The firmware is configured to communicate with central monitoring system 310, which provides an alerting mechanism that generates real-time alerts and notifies stakeholders, a management interface that allows monitoring/managing alerts and taking remedial actions, and a security database that stores alerts and security event logs.

This architecture ensures continuous monitoring, early detection, and swift response to tampering attempts. It safeguards edge devices and strengthens system security.

Figure 4:
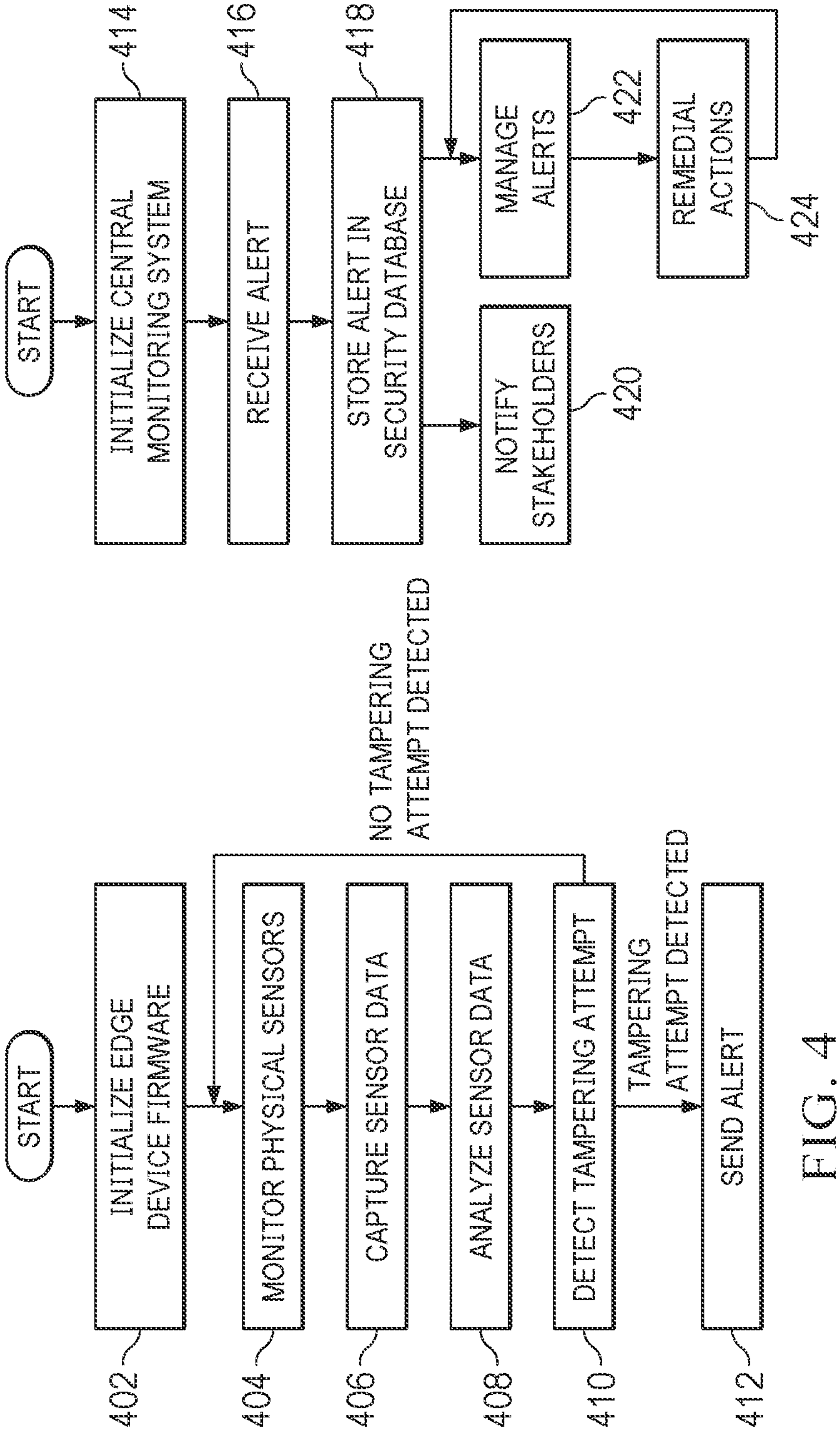
FIG. 4 illustrates a flow chart of an example method, in accordance with embodiments of the present disclosure.

FIG. 4 provides a flow chart of an example method. As shown, the method may include a portion to be carried out at the edge device (shown on the left) and a portion to be carried out at the central monitoring system (shown on the right).

At step 402, the edge device firmware is initialized. Likewise, at step 414, the central monitoring system is initialized.

At step 404, the edge device may continuously or continually monitor its physical sensors for indicators such as vibration, acceleration, and temperature. The sensor data is captured at step 406 and transmitted to the edge device firmware. The edge device firmware analyzes the sensor data at step 408 for any tampering attempts.

If a tampering attempt is detected at step 410, the edge device firmware triggers an alert. Otherwise, the edge device's method loops back to step 404.

If an alert is generated at step 412, it is sent to the central monitoring system, which receives it at step 416 and stores it in the security database at step 418.

The alerting mechanism in the central monitoring system may then notify the relevant stakeholders (e.g., administrators and/or security personnel) about the tampering attempt at step 420.

The management interface may also allow security personnel to view and manage the tampering alerts at step 422. Remedial actions (e.g., prompted by the security personnel and/or undertaken autonomously) may occur at step 424 based on the severity of the tampering event. The central monitoring system then continuously monitors for new alerts and manages the security database.

One of ordinary skill in the art with the benefit of this disclosure will understand that the preferred initialization points for the method depicted in FIG. 4 and the order of the steps comprising the method may depend on the implementation chosen. In these and other embodiments, the method may be implemented as hardware, firmware, software, applications, functions, libraries, or other instructions. Further, although FIG. 4 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the methods.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor;

a plurality of physical sensors including at least one sensor selected from the group consisting of vibration sensors, accelerometers, chassis opening sensors, and tilt sensors; and a firmware having instructions coded thereon that are executable by the at least one processor for:

continuously monitoring the plurality of physical sensors;

detecting, via one or more of the physical sensors, an unauthorized tampering event associated with the information handling system;

triggering an alert in response to detecting the unauthorized tampering event; and transmitting data regarding the tampering event to a central monitoring system, wherein the transmitted data comprises the alert, and wherein the central monitoring system is configured to:

receive data regarding a plurality of tampering events from a plurality of information handling systems;

determine a severity level from a group of severity levels for each of the plurality of tampering events based on a type of physical sensor that detected the respective tampering event, wherein the group of severity levels includes a low-severity level associated with accelerometer events and a high-severity level associated with chassis opening sensor events, such that a tampering event detected by an accelerometer is assigned a lower severity level than a tampering event detected by a chassis opening sensor; and perform a remedial action based on the determined severity level.

2. The information handling system of claim 1, wherein the information handling system is a portion of a hyper-converged infrastructure (HCI) system.

3. The information handling system of claim 2, wherein the information handling system is an edge node of the HCI system.

4. The information handling system of claim 1, further comprising at least one tamper-evident mechanism.

5. The information handling system of claim 4, wherein the tamper-evident mechanism is selected from the group consisting of seals and intrusion detection systems.

6. A method comprising:

an information handling system continuously monitoring a plurality of physical sensors thereof, wherein the plurality of physical sensors include at least one sensor selected from the group consisting of vibration sensors, accelerometers, chassis opening sensors, and tilt sensors;

the information handling system detecting, via the plurality of physical sensors thereof, an unauthorized tampering event associated with the information handling system;

the information handling system triggering an alert in response to detecting the unauthorized tampering event; and the information handling system transmitting, via a firmware thereof, data regarding the tampering event to a central monitoring system, wherein the transmitted data comprises the alert, and wherein the central monitoring system is configured to:

receive data regarding a plurality of tampering events from a plurality of information handling systems;

determine a severity level from a group of severity levels for each of the plurality of tampering events based on a type of physical sensor that detected the respective tampering event, wherein the group of severity levels includes a low-severity level associated with accelerometer events and a high-severity level associated with chassis opening sensor events, such that a tampering event detected by an accelerometer is assigned a lower severity level than a tampering event detected by a chassis opening sensor; and perform a remedial action based on the determined severity level.

7. The method of claim 6, wherein the information handling system is a portion of a hyper-converged infrastructure (HCI) system.

8. The method of claim 7, wherein the information handling system is an edge node of the HCI system.

9. The method of claim 6, wherein the information handling system includes at least one tamper-evident mechanism.

10. The method of claim 9, wherein the tamper-evident mechanism is selected from the group consisting of seals and intrusion detection systems.

11. An article of manufacture comprising a non-transitory, computer-readable medium having computer-executable instructions thereon that are executable by a processor of an information handling system for:

continuously monitoring a plurality of physical sensors of the information handling system, wherein the plurality of physical sensors include at least one sensor selected from the group consisting of vibration sensors, accelerometers, chassis opening sensors, and tilt sensors;

detecting, via the plurality of physical sensors, an unauthorized tampering event associated with the information handling system;

triggering an alert in response to detecting the unauthorized tampering event; and transmitting, via a firmware thereof, data regarding the tampering event to a central monitoring system, wherein the transmitted data comprises the alert, and wherein the central monitoring system is configured to:

receive data regarding a plurality of tampering events from a plurality of information handling systems;

determine a severity level from a group of severity levels for each of the plurality of tampering events based on a type of physical sensor that detected the respective tampering event, wherein the group of severity levels includes a low-severity level associated with accelerometer events and a high-severity level associated with chassis opening sensor events, such that a tampering event detected by an accelerometer is assigned a lower severity level than a tampering event detected by a chassis opening sensor; and perform a remedial action based on the determined severity level.

12. The article of claim 11, wherein the information handling system is a portion of a hyper-converged infrastructure (HCI) system.

13. The article of claim 12, wherein the information handling system is an edge node of the HCI system.

14. The article of claim 11, wherein the information handling system includes at least one tamper-evident mechanism.

15. The article of claim 14, wherein the tamper-evident mechanism is selected from the group consisting of seals and intrusion detection systems.

* * * * *